United States Patent
Bauer et al.

(10) Patent No.: US 11,846,229 B2
(45) Date of Patent: Dec. 19, 2023

(54) INTERNAL COMBUSTION ENGINE SYSTEM

(71) Applicant: Volvo Truck Corporation, Gothenburg (SE)

(72) Inventors: Martin Bauer, Anderslöv (SE); Fredrik Rahm, Hörby (SE)

(73) Assignee: Volvo Truck Corporation, Gothenburg (SE)

( * ) Notice: Subject to any disclaimer, the term of this patent is extended or adjusted under 35 U.S.C. 154(b) by 175 days.

(21) Appl. No.: 17/622,890

(22) PCT Filed: Jul. 2, 2019

(86) PCT No.: PCT/EP2019/067786
§ 371 (c)(1),
(2) Date: Dec. 27, 2021

(87) PCT Pub. No.: WO2021/001031
PCT Pub. Date: Jan. 7, 2021

(65) Prior Publication Data
US 2022/0228526 A1 Jul. 21, 2022

(51) Int. Cl.
*F02B 37/00* (2006.01)
*F02B 37/22* (2006.01)
(Continued)

(52) U.S. Cl.
CPC .............. *F02B 37/22* (2013.01); *F02B 37/04* (2013.01); *F02M 35/10157* (2013.01); *F01N 13/10* (2013.01); *H02K 7/1823* (2013.01)

(58) Field of Classification Search
CPC ........ F02B 37/22; F02B 37/04; F02B 37/004; F02B 41/10; F02M 35/10157;
(Continued)

(56) References Cited

U.S. PATENT DOCUMENTS

| | | | |
|---|---|---|---|
| 11,692,498 B2 * | 7/2023 | Carlén | F02D 9/04 60/605.2 |
| 2005/0109029 A1 * | 5/2005 | Busch | F01N 3/30 60/307 |

(Continued)

FOREIGN PATENT DOCUMENTS

| | | |
|---|---|---|
| EP | 2711523 A1 | 3/2014 |
| EP | 2886828 A1 | 6/2015 |

(Continued)

OTHER PUBLICATIONS

International Search Report and Written Opinion of the International Searching Authority, PCT/EP2019/067, dated Dec. 20, 2019, 11 pages.

(Continued)

*Primary Examiner* — Julio C. Gonzalez
(74) *Attorney, Agent, or Firm* — Sage Patent Group (57) ABSTRACT

An internal combustion engine system includes an internal combustion engine having a cylinder, an air intake system to feed air to the cylinder, an exhaust gas system to feed exhaust gas away from the cylinder, a turbocharger including a turbocharger turbine operatively connected to a turbocharger compressor, wherein the air intake system is arranged to feed intake air via the turbocharger compressor and wherein the exhaust gas system is arranged to feed exhaust gas via the turbocharger turbine so as to drive the turbocharger compressor, and wherein the internal combustion engine system further includes a positive displacement machine arranged in the exhaust gas system downstream of the turbocharger turbine. The internal combustion engine system further includes a variable drive unit to drive the positive displacement machine. The internal combustion engine system controls the drive unit so as to control a flow of exhaust gas through the positive displacement machine.

17 Claims, 3 Drawing Sheets

(51) Int. Cl.
*F02B 37/04* (2006.01)
*F02M 35/10* (2006.01)
F01N 13/10 (2010.01)
H02K 7/18 (2006.01)

(58) Field of Classification Search
CPC ........ F01N 13/10; F01N 5/00; F01N 2260/06; F01N 2340/06; F01N 5/04; H02K 7/1823; Y02T 10/12
See application file for complete search history.

(56) References Cited

U.S. PATENT DOCUMENTS

| | | |
|---|---|---|
| 2009/0218815 A1 | 9/2009 | Stahlhut et al. |
| 2009/0249786 A1* | 10/2009 | Garrett .................. F02B 37/004 415/191 |
| 2011/0172894 A1 | 7/2011 | De Graaff et al. |
| 2012/0119509 A1 | 5/2012 | West |

FOREIGN PATENT DOCUMENTS

| | | |
|---|---|---|
| FR | 2875849 A1 | 3/2006 |
| WO | 2013130774 A1 | 9/2013 |

OTHER PUBLICATIONS

International Preliminary Report on Patentability of the International Preliminary Examining Authority, PCT/EP2019/067786, dated Sep. 23, 2021, 14 pages.

* cited by examiner

INTERNAL COMBUSTION ENGINE SYSTEM

CROSS REFERENCE TO RELATED APPLICATIONS

This application is a 35 U.S.C. § 371 national stage application of PCT International Application No. PCT/EP2019/067786 filed on Jul. 2, 2019, the disclosure and content of which is incorporated by reference herein in its entirety.

TECHNICAL FIELD

The invention relates to an internal combustion engine system according to the preamble of claim 1. The invention also relates to a vehicle provided with such a system and a method for controlling such a system.

The invention is particularly intended to be applied in heavy-duty vehicles, such as trucks, buses and construction equipment, but can be applied also in other vehicles, boats, etc.

BACKGROUND

There is a general desire of increasing efficiency and reducing fuel combustion of internal combustion engine systems. Many engine systems are provided with a turbocharging arrangement where a turbine driven by exhaust gas drives a compressor that compresses intake air fed to the engine. In such systems the turbocharger turbine sizing is a compromise between several requirements, such as torque at different rotation speeds, high altitude operation, fuel consumption, exhaust temperature, etc. A typical solution is to choose a relatively small turbine for drivability and quick response and to use a wastegate for (partially) bypassing the turbine and controlling boost (turbocharging pressure) when needed. From a gas exchange point of view it is advantageous to operate with a more open turbine (less restriction, lower back pressure) but then the expected performance (torque, response, etc.) will not be met. There are thus a lot of parameters and components to play around with when trying to increase the efficiency of an internal combustion engine system provided with a turbocharging arrangement.

Another concept for increasing efficiency in engine systems of the above type is turbo compound engines where a power turbine driven by the exhaust gas is arranged in the exhaust gas stream and where energy is recovered from the exhaust gas and transferred back to the engine system (or to the vehicle equipped with the engine system) via mechanical or electrical means. US2012/0119509 discloses an example of a turbo compound engine where a turbo compound turbine driven by the exhaust gas is arranged downstream the turbocharging turbine and where an electromagnetic power split device is arranged to distribute recovered energy between mechanical and electric output. A main advantage of the turbo compound engine of US2012/0119509 appears to be an improved efficiency and reliability of the electromagnetic power split device compared to known, mechanical, power split devices.

Although a large number of possibilities for increasing efficiency and decreasing fuel consumption of internal combustion engine systems have been presented over the years there is still a need for improvements.

SUMMARY

An object of the invention is to provide an internal combustion engine system and a method for operating such a system that increases efficiency and lowers fuel consumption. According to a first aspect of the invention, the object is achieved by a system according to claim 1. According to a second aspect of the invention, the object is achieved by a method according to another independent claim. According to a further aspect of the invention, the object is achieved by a computer-related product/medium or a control unit for controlling the method.

The invention relates to an internal combustion engine system comprising: an internal combustion engine provided with at least one cylinder; an air intake system arranged to feed air to the at least one cylinder; an exhaust gas system arranged to feed exhaust gas away from the at least one cylinder; a turbocharger arrangement comprising a turbocharger turbine operatively connected to a turbocharger compressor; wherein the air intake system is arranged to feed intake air via the turbocharger compressor and wherein the exhaust gas system is arranged to feed exhaust gas via the turbocharger turbine so as to drive the turbocharger compressor, wherein the internal combustion engine system further comprises a turbomachine arranged in the exhaust gas system downstream of the turbocharger turbine.

The system is characterized in that the turbomachine is a positive displacement machine configured to displace gas from an inlet to an outlet thereof by trapping a fixed amount of gas and forcing that trapped amount of gas from the inlet to the outlet, wherein the internal combustion engine system further comprises a variable drive unit arranged to drive the positive displacement machine, and wherein the internal combustion engine system is configured to control the drive unit so as to control a flow of exhaust gas through the positive displacement machine.

The term "turbomachine" is here used in its general sense covering all or most types of pumps, turbines, compressors, etc., such as the exhaust gas driven turbo compound turbine of US2012/0119509 and a positive displacement machine, or "pump", as defined above.

By arranging a controllable drive unit for such a displacement machine positioned downstream the turbocharging turbine it becomes possible to control the turbocharger turbine expansion ratio (TER) and drive the displacement machine in different modes or drive levels in dependence of different engine operation modes or conditions. The drive unit may be an electric motor (that preferably also works as a generator) driving a rotary member of the displacement machine via a rotatable shaft.

Besides driving the displacement machine in a "neutral mode" where the flow rate of exhaust gas is not affected (i.e. the displacement machine is operated so that the exhaust gas pressure is approximately the same at the inlet and the outlet of the displacement machine), the displacement machine can be driven in a "boost mode" (i.e. a high power/speed mode creating a lower pressure at the inlet than at the outlet of the displacement machine) where the exhaust back pressure downstream the turbocharger turbine is reduced, where exhaust gas is drawn/pulled downstream out of the turbocharging turbine and where the TER is increased.

Further, the displacement machine can be driven in an "energy recovery mode" or "compound mode" (i.e. a low power/speed mode where the exhaust gas pressure is higher at the inlet than at the outlet of the displacement machine) where the TER is decreased and where the exhaust gas pressure can be used to drive the displacement machine so as to generate power that can be used to produce electricity (e.g. by using a drive unit in the form of an electric motor/generator) or to produce additional engine driving power (e.g. via a crankshaft of the engine).

By controlling the TER the efficiency of the turbocharging arrangement can be improved, which in turn improves efficiency and/or lowers fuel consumption of the entire engine system. In addition, the inventive concept allows for the use of a more open turbocharging turbine that decreases the back pressure (since the displacement machine can be used to regulate back pressure) and it also makes it possible to control the TER without a wastegate (which, as implied by the name, is normally a waste of energy and thus a reduction of overall engine system efficiency). The capability of controlling the TER and also the possibility to recover energy can be used to reduce engine fuel consumption. Further advantages are improved transient response, e.g. turbolag can be reduced by quickly increasing TER by quickly setting the displacement machine in "boost mode", and that the displacement machine can be used as a flow meter for the exhaust gas, which is useful for additional input to a control system arranged to control the engine system.

The engine system may comprise an exhaust aftertreatment system (EATS) arranged downstream the turbocharging turbine and if so it may be an advantage to arrange the positive displacement machine downstream the EATS to facilitate heating of the EATS when needed.

The engine system may also comprise an EGR system where an EGR conduit connects the exhaust system and the air intake system so as to allow recirculation of a portion of the exhaust gas, for instance a high pressure (HP) EGR system where the EGR conduit connects the air intake and exhaust systems upstream the turbocharger turbine and downstream the turbocharger compressor. In such a case an increased drive of EGR can be achieved by reducing the drive speed of the displacement machine and thereby increasing the pressure of the exhaust gas. The displacement machine can thus be used to regulate the EGR flow.

The principle of the present invention is in clear contrast to conventional turbo compound engines such as the system disclosed in US2012/0119509 where the turbo compound turbine is driven only by the exhaust gas, which, for instance, does not allow for any "boost mode".

The drive unit for controlling driving of the positive displacement machine is typically controlled directly or indirectly by an engine system control unit or control circuitry arranged to control also other parts of the engine system. The engine system control unit is arranged to receive data from a variety of sensors (temperature, pressure, rotation speed of various parts, accelerator pedal position or other request for increasing or decreasing power, throttle position, air flow, crankshaft position, etc.), to make various calculations, to have access to stored (mapped) data, to control various actuators and components, etc. Control units/circuitries of this type are well known as such.

For controlling a drive unit arranged to rotate a rotary member of the displacement machine it is useful to provide the control unit with information on the exhaust gas pressure at the inlet and outlet of the displacement machine (or at least a difference or ratio between these two pressures) and with information on a current rotation speed of the rotary member. Such information can be obtained from pressure and speed sensors. The drive unit may also be controlled using predicted (calculated) pressure ratio based on map values (stored data) for volumetric efficiency of displacement machine in combination with speed control. Useful input for controlling the drive unit is also predicted (calculated) or measured exhaust gas temperature upstream and downstream of the displacement machine (in exhaust manifold and upstream of any exhaust aftertreatment system; also the temperature in the exhaust aftertreatment system may be useful in certain situations). A further example of useful input is a measured or calculated pressure in the air intake system, which for instance is of importance for controlling the EGR flow.

In an embodiment the internal combustion engine system is configured to control the drive unit so as to operate the positive displacement machine unit in at least a first mode where a pressure ratio (PR) given by a pressure at the outlet of the positive displacement machine divided by a pressure at the inlet of the positive displacement machine is above 1. This includes the engine "boost mode" mentioned above. "Boost mode" typically means that the PR is significantly above 1. Such a "boost mode" is typically used temporarily when additional power is required and can be activated by an engine system control unit that receives a signal that additional power is desired, such as a signal triggered by a certain pedal position or load, etc. However, operation of the displacement machine in the first mode (PR>1) is not restricted to temporary situations where additional power is needed. For instance, a PR only slightly above 1 may be used during normal engine operation under standard road load conditions to achieve a high overall engine system efficiency. Such a mode may be referred to as "normal mode" for the engine rather than "boost mode" (where the drive level of the displacement machine is higher than in "normal mode" but where the displacement machine in both cases operates in its first mode with PR>1).

In an embodiment the internal combustion engine system is configured to control the drive unit so as to operate the positive displacement machine in at least a second mode where a pressure ratio (PR) given by a pressure at the outlet of the positive displacement machine divided by a pressure at the inlet of the positive displacement machine is below 1. This includes the engine "energy recovery mode" mentioned above. In general, energy may be recovered when the engine operation conditions are such that it is possible to recover energy from the flow of exhaust gas. The energy may be recovered by using an electric motor/generator as drive unit for the displacement machine. The displacement machine may, however, be operated with PR below 1 without recovering any energy via the drive unit. For instance, a PR below 1 can be used at certain engine operation modes or conditions to increase the back pressure and decrease the flow of exhaust through the turbocharger turbine and thus reduce the speed of the turbocharger turbine and compressor without using a wastegate and instead increase the EGR flow.

The second mode (PR<1) includes the situation where the displacement machine is held in a stationary position and substantially blocks the flow of exhaust gas, which would lead to a very low PR.

In an embodiment the internal combustion engine system is configured to control the drive unit so as to operate the positive displacement machine in at least a third mode where a pressure ratio (PR) given by a pressure at the outlet of the positive displacement machine divided by a pressure at the inlet of the positive displacement machine is substantially equal to 1. This is thus the "neutral mode" mentioned above. This mode is typically used when there is no need or desire to have any influence on the flow of exhaust gas. This could be the case at standard road load cruise conditions. The standard or normal engine mode may, however, depend on the particular engine system and may not necessarily be exactly the "neutral mode" but, as mentioned above, may be set to e.g. a PR that is slightly above 1 (but considerably less than a typical "boost mode").

The displacement machine may further be used in what may be denoted engine "heat mode" for the purpose of heating the EATS where the temperature of the EATS is or becomes too low (at cold start or during operation). If so, for instance triggered by a signal from a temperature sensor in the EATS, the drive speed/power of the displacement machine is reduced or set to a lower value (lower than it would be with a sufficient EATS temperature) so as to more rapidly decrease the exhaust gas flow rate, increase the temperature of the exhaust gas and heat the EATS. This is typically done with a PR below 1 (reduced from some higher value of PR or initially set to a desired low PR-value if cold starting the engine), but depending on the situation it might be sufficient to reduce the PR from some higher PR to some lower PR where the lower PR might be 1 or above 1. When a sufficient EATS temperature has been reached the engine mode is switched from "heat mode" to another mode suitable for the current conditions and the operation mode of the displacement machine is adjusted accordingly.

In an embodiment the internal combustion engine system is configured to operate the positive displacement machine in different modes or drive levels in dependence of an operating mode of the internal combustion engine. As described above, the positive displacement machine can be operated in either of the first, second and third modes, and each of these three modes can be used in dependence of different operating modes or conditions of the engine, such as "boost mode", "energy recover mode", "normal mode", "heat mode", etc. In addition, the drive/power level of the displacement machine may be varied within at least the first and second modes to adapt to the different engine operation modes/conditions.

In an embodiment the positive displacement machine comprises at least one rotary member operatively connected to the drive unit, wherein the internal combustion engine system is configured to control a rotation speed of the rotary member.

In an embodiment the internal combustion engine system is configured to be capable of transferring a driving power both from the variable drive unit to the positive displacement machine as well as from the positive displacement machine to the variable drive unit.

In an embodiment the positive displacement machine is a rotary roots type blower having a pair of rotary members provided with meshing lobes. Alternatively, the displacement machine may be, for instance, a piston expander or a screw compressor or a wing pump. However, a roots blower has an advantage in that it typically has a displacement volume and speed range, i.e. a flow span, that is well adapted to the flow of exhaust gas of internal combustion engines of the type of interest here (e.g. for powering propulsion of a truck).

In an embodiment the drive unit is an electric motor, preferably an electric motor/generator. Alternatively, the drive unit may be mechanical (belt, chain or gear driven with a variable gear ratio and connected to the crankshaft) or hydraulic (hydraulic motor/pump with variable flow).

In an embodiment a first pressure sensor is arranged in the exhaust gas system upstream the positive displacement machine and downstream the turbocharger turbine.

In an embodiment a second pressure sensor is arranged in the exhaust gas system downstream the positive displacement machine.

Knowledge of the pressure upstream and downstream of the displacement machine, and thus knowledge of the pressure ratio (PR), is very useful input for controlling and monitoring of the drive unit. Physical pressure sensors upstream and downstream the positive displacement machine may, however, not be necessary since it is possible to make use of virtual sensors involving calculations based on signals from various existing physical sensors and on other engine system data. A predicted pressure ratio based on map values for volumetric efficiency of displacement machine in combination with speed control can be used for regulating the displacement machine.

In an embodiment the internal combustion engine system is provided with a control system configured to control operation of the internal combustion engine system, wherein the control system comprises a control circuitry configured to receive input signals, make calculations, and send control signals to at least the variable drive unit arranged to drive the positive displacement machine.

The invention also relates to a vehicle comprising an internal combustion engine system arranged to power propulsion of the vehicle, wherein the internal combustion engine system is arranged according to the above.

The invention also relates to a method of controlling an internal combustion engine system comprising: an internal combustion engine provided with at least one cylinder; an air intake system arranged to feed air to the at least one cylinder; an exhaust gas system arranged to feed exhaust gas away from the at least one cylinder; a turbocharger arrangement comprising a turbocharger turbine operatively connected to a turbocharger compressor, wherein the air intake system is arranged to feed intake air via the turbocharger compressor and wherein the exhaust gas system is arranged to feed exhaust gas via the turbocharger turbine so as to drive the turbocharger compressor, wherein the internal combustion engine system further comprises a positive displacement machine arranged in the exhaust gas system downstream of the turbocharger turbine, wherein the positive displacement machine is configured to displace gas from an inlet to an outlet thereof by trapping a fixed amount of gas and forcing that trapped amount of gas from the inlet to the outlet, and wherein the internal combustion engine system further comprises a variable drive unit arranged to drive the positive displacement machine, said method comprising the step of: controlling the drive unit so as to control a flow of exhaust gas through the positive displacement machine.

In an embodiment the method comprises the step of: controlling the drive unit so as to operate the positive displacement machine unit in at least one of a first, a second and a third mode, wherein, in the first mode, a pressure ratio (PR) given by a pressure at the outlet of the positive displacement machine divided by a pressure at the inlet of the positive displacement machine is above 1, wherein, in the second mode, the pressure ratio (PR) is below 1, and wherein, in the third mode, the pressure ratio (PR) is substantially equal to 1.

In an embodiment the method comprises the step of: operating the positive displacement machine in different modes or drive levels in dependence of an operating mode of the internal combustion engine.

In an embodiment the method comprises the method comprises the steps of: receiving a signal indicative of a desire for increased engine power; and increasing a drive power/speed of the positive displacement machine to a level that is higher than when receiving the signal indicative of the desire for increased engine power and that forms part of a first operation mode of the positive displacement machine where a pressure ratio (PR) given by a pressure at the outlet of the positive displacement machine divided by a pressure at the inlet of the positive displacement machine is above 1.

In an embodiment the method comprises the steps of: receiving a signal indicative of a temperature of an exhaust aftertreatment system; determining whether the temperature of the exhaust aftertreatment system is below a threshold level: and when so: reducing a drive power/speed of the positive displacement machine to a level that is lower than when receiving the signal indicative of the temperature of the exhaust aftertreatment system; or, if the internal combustion engine is not in operation when receiving the signal indicative of the temperature of the exhaust aftertreatment system: setting, when starting the internal combustion engine, a drive power/speed of the positive displacement machine to a level that forms part of a second operation mode of the positive displacement machine where a pressure ratio (PR) given by a pressure at the outlet of the positive displacement machine divided by a pressure at the inlet of the positive displacement machine is below 1.

In an embodiment, when operating the positive displacement machine in the second mode, the method comprises the steps of: driving the positive displacement machine at least partly by means of the exhaust gas flowing through the exhaust gas system, and recovering an energy transferred from the exhaust gas flow to the positive displacement machine while driving the positive displacement machine.

In an embodiment the step of recovering the transferred energy comprises the step of: converting the recovered energy to electric energy and use the electric energy for driving electric equipment or for charging an electric battery; or using the recovered energy for adding driving power to a crankshaft of the engine. "Driving electric equipment" may include adding driving power to an electric motor arranged for (complementary) propulsion of the vehicle and/or powering other electric equipment.

In an embodiment the positive displacement machine comprises at least one rotary member operatively connected to the drive unit, wherein the step of controlling the drive unit comprises controlling a rotational speed of the rotary member.

In an embodiment the positive displacement machine is a rotary roots type blower having a pair of rotary members provided with meshing lobes.

The invention also relates to:
a computer program comprising program code means for performing any of the steps above when said program is run on a computer;
a computer readable medium carrying a computer program comprising program code means for performing any of the steps above when said program product is run on a computer; and
a control circuitry for controlling an internal combustion engine system of the above type,
the control circuitry being configured to perform any of the steps of the above method.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
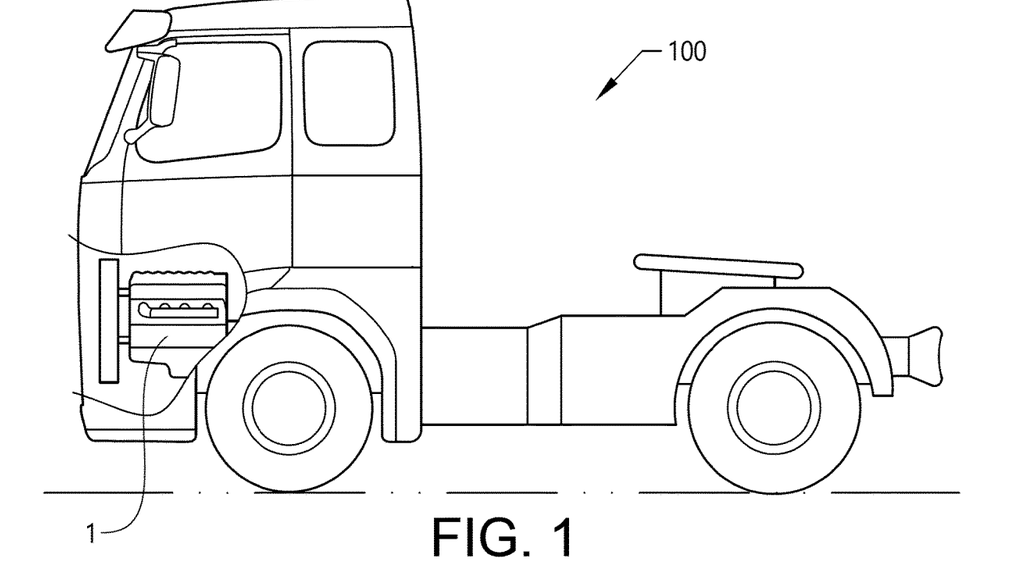
FIG. 1 is a schematic view of a truck provided with an example of an internal combustion engine system according to the invention.

FIG. 1 shows a schematic view of a truck 100 provided with an internal combustion engine system 1 according to the invention.

Figure 2:
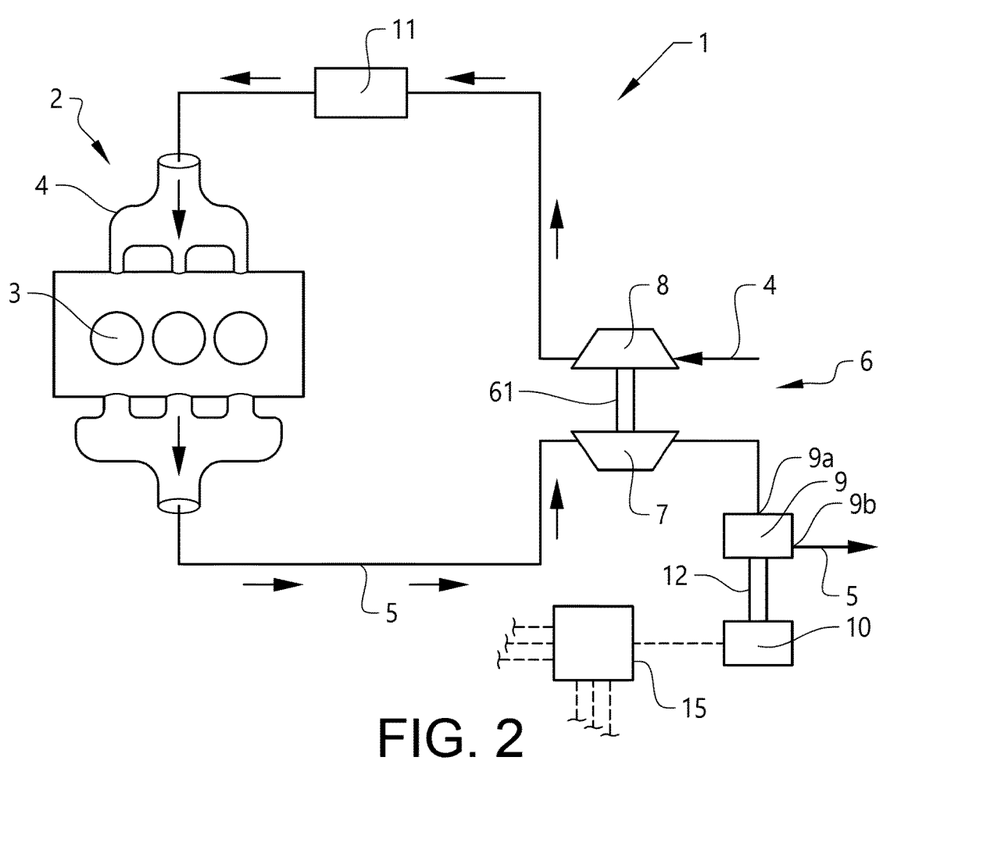
FIG. 2 is a schematic view of the internal combustion engine system according to FIG. 1.

FIG. 2 shows a schematic view of the internal combustion engine system 1 according to FIG. 1. The exemplified engine system 1 comprises an internal combustion engine 2 provided with three cylinders 3, an air intake system 4 arranged to feed air to the cylinders 3, an exhaust gas system 5 arranged to feed exhaust gas away from the cylinders 3, and a turbocharger arrangement 6 comprising a turbocharger turbine 7 operatively connected, via shaft 61, to a turbocharger compressor 8. As indicated by the arrows, the air intake system 4 is arranged to feed intake air via the turbocharger compressor 8 and further via a charging air cooler 11, and the exhaust gas system 5 is arranged to feed exhaust gas via the turbocharger turbine 7 so as to drive the turbocharger compressor 8.

Figure 3:
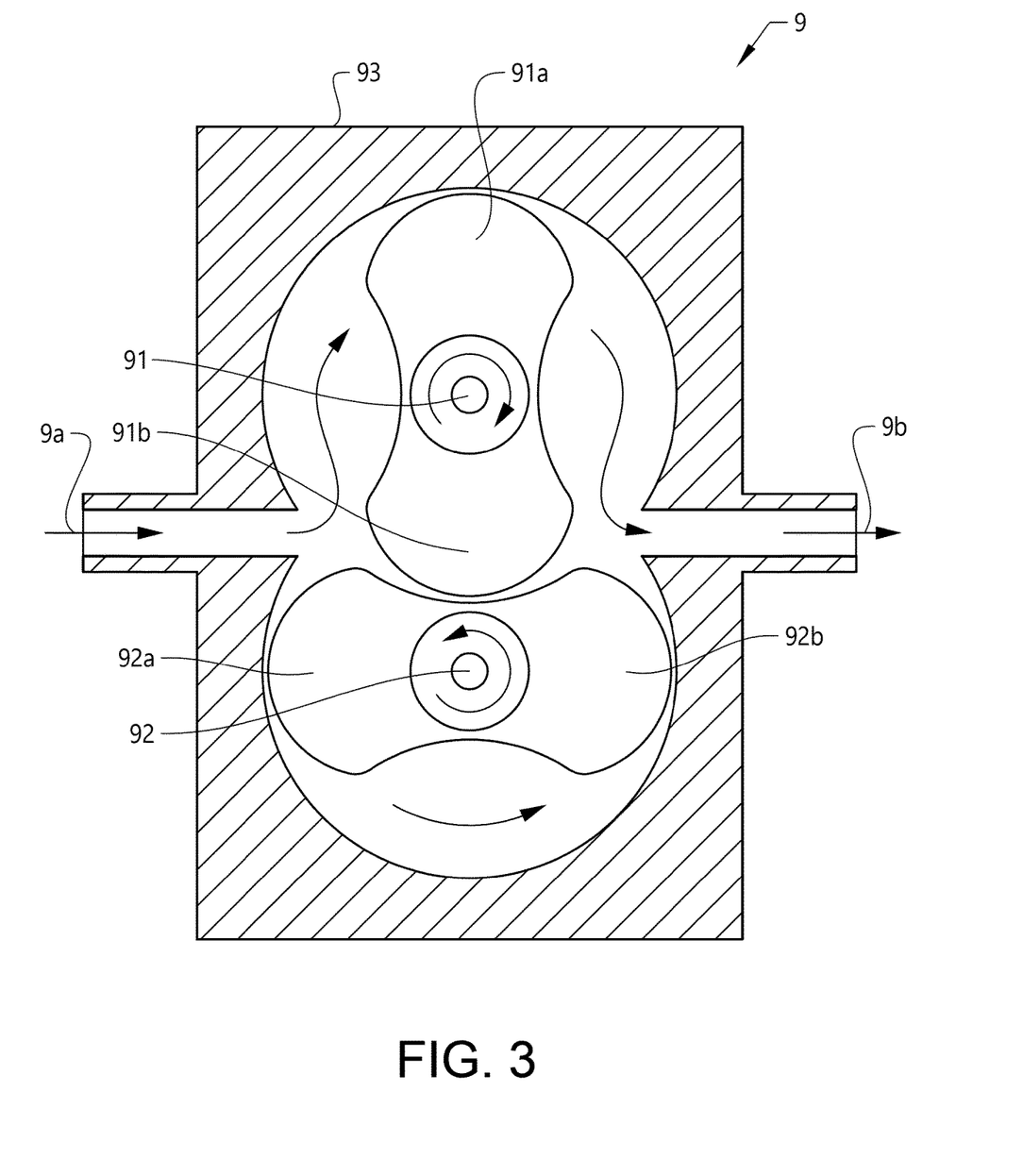
FIG. 3 is a schematic view of a positive displacement machine forming part of the internal combustion engine system according to FIG. 2.

The internal combustion engine system 1 further comprises a turbomachine arranged in the exhaust gas system 5 downstream of the turbocharger turbine 7, where the turbomachine is a positive displacement machine 9 configured to displace gas from an inlet 9a to an outlet 9b thereof by trapping a fixed amount of gas and forcing that trapped amount of gas from the inlet 9a to the outlet 9b (see also FIG. 3).

The internal combustion engine system 1 further comprises a variable drive unit in the form of an electric motor/generator 10 arranged to drive (and, in certain modes of operation, be driven by, see below) the positive displacement machine 9 via drive shaft 12. The internal combustion engine system 1 is configured by means of control circuitry 15 to control the drive unit 10 so as to control a flow of exhaust gas through the positive displacement machine 9.

The control circuitry 15 is arranged to receive and send various sensor and command signals from/to various sensors and components (indicated by dashed lines), to store and have access to various engine system operation data, to make calculations and predictions, etc., and to control the entire engine system. Such control circuitries, which may comprise one or more connected control units, are well known as such.

FIG. 3 shows a schematic view of the positive displacement machine 9 arranged in the exhaust gas system 5 downstream of the turbocharger turbine 7, wherein the positive displacement machine 9 is in the form of a Roots type blower having first and second rotary members 91, 92 provided with meshing lobes 91a, 91b, 92a, 92b configured to rotate inside a surrounding housing 93. Roots type blowers are well known as such. In some Roots type blowers each rotary member is provided with more than two lobes. In relation to FIG. 3 an incoming exhaust flow (from the turbocharger turbine 7 as indicated in FIG. 1) passes the inlet 9a at the left and is displaced (as indicated by the arrows) by the rotary members 91, 92 to the outlet 9b at the right and flows further downstream the exhaust gas system 5.

An exhaust aftertreatment system (EATS, not shown) may be arranged upstream or downstream the positive displacement machine 9.

The engine system 1 is further provided with a high pressure EGR system where an EGR conduit (not shown) connects the exhaust system 5 and the air intake system 4 upstream the turbocharger turbine 7 and downstream the turbocharger compressor 8 so as to allow recirculation of a portion of the exhaust gas.

The positive displacement machine 9 has a linear dependence between rotation speed (of the rotary members 91, 92) and volume flow through the machine 9 and the flow curve (flow as a function of speed) passes the origin, i.e. when the rotation speed is zero (i.e. when the rotary members 91, 92 are stationary) there is no flow through the displacement machine 9 (besides some leakage). The flow of exhaust gas through the displacement machine 9 can thus be controlled with high accuracy by controlling the rotation speed of the rotary members 91, 92 and thus by controlling the drive unit/electric motor/generator 10. This is in contrast to a regular turbine that is an "open" component that allows through-flow also when standing still (the flow curve does not pass the origin).

The drive unit 10 can be controlled to operate the positive displacement machine unit 9 in three different modes: a first, a second and a third mode, wherein, in the first mode, a pressure ratio (PR), given by a pressure at the outlet 9b divided by a pressure at the inlet 9a, is above 1, wherein, in the second mode, the pressure ratio (PR) is below 1, and wherein, in the third mode, the pressure ratio (PR) is substantially equal to 1. The positive displacement machine unit 9 can also be operated with different drive level/speed/power within at least the first and second modes (but also slightly within the third mode depending on which range of PR is considered to be "substantially equal" to 1).

In general, the drive unit 10 can be controlled so as to control the flow of exhaust gas through the positive displacement machine 9 in dependence of an operating mode of the internal combustion engine 2. As explained further above, this allows for controlling the turbocharger turbine 7 expansion ratio (TER) and improving the efficiency of the turbocharging arrangement 6, which in turn improves efficiency and/or lowers fuel consumption of the entire engine system 1. Exactly how to control the drive unit 10 to improve engine system efficiency etc. depends not only on the engine operation mode/condition but also on the particular design of the engine 2 and the particular design of the turbocharging arrangement 6.

A first example (FIG. 4) of a method of controlling the internal combustion engine system 1 comprises the steps of:
S0 operating the engine 2 in a normal operation mode;
S1 receiving, by the control circuitry 15, a signal indicative of a desire for increased engine power;
S2 increasing a drive power/speed of the positive displacement machine 9 to a level that is higher than when receiving the signal indicative of the desire for increased engine power and that forms part of the first operation mode of the positive displacement machine 9 where the pressure ratio (PR) is above 1.

Figures 4, 5:
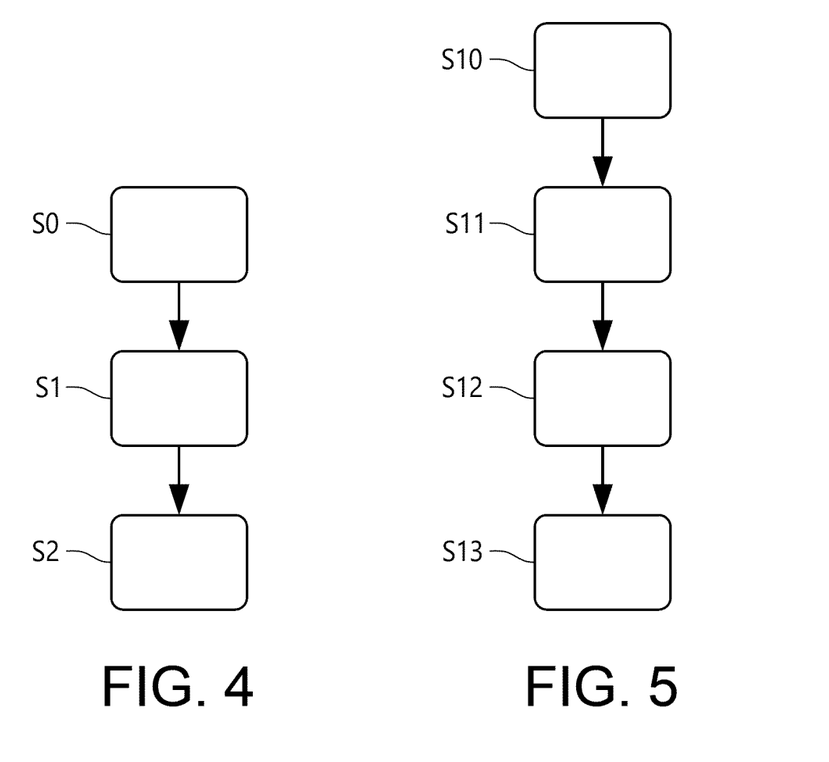
FIGS. 4-7 show flow diagrams for examples of methods for controlling the engine system of FIG. 2.

In step S0 the normal operation mode may be a standard road load condition for the vehicle 100 where the positive displacement machine 9 is operated with a PR at or close to 1, i.e. in or close to the third mode. It is not necessary, however that the initial mode in step S0 is a normal operation mode, it could be some other mode where the PR is below 1.

In step S1 the signal may be triggered by a certain pedal position or some other triggering event, such as an increased load.

In step S2 the drive speed of the positive displacement machine 9 is increased so that a "boost mode" is achieved where the PR is significantly above 1, where the exhaust back pressure downstream the turbocharger turbine 7 is reduced, where exhaust gas is drawn/pulled downstream out of the turbocharging turbine 7 and where the TER is increased. Exactly how much the drive speed of the positive displacement machine 9 should be increased depends on the PR-value at S0 and the particular design of the engine system.

A second example (FIG. 5) of a method of controlling the internal combustion engine system 1 comprises the steps of:
S10 operating the engine 2 in some operation mode;
S11 receiving, by the control circuitry 15, a signal indicative of a temperature of an exhaust aftertreatment system (EATS);
S12 determining whether the temperature of the EATS is below a threshold level; and when so:
S13 reducing a drive power/speed of the positive displacement machine 9 to a level that is lower than when receiving the signal indicative of the temperature of the EATS.

Step 10 may be a low-load operation mode that is continued for some time so that the temperature of the EATS falls towards a too low level.

In step 13 the drive speed of the machine 9 is reduced, preferably so that PR gets below 1, so as to increase the temperature of the exhaust gas which then heats up the EATS. Step 13 may be followed by a step of verifying that the EATS temperature is sufficiently high and a step of reverting to the engine operation mode of step S10.

A third example (FIG. 6) of a method of controlling the internal combustion engine system 1 relates to cold start of the engine (i.e. the engine 2 is initially not in operation) and comprises the steps of:
S21 receiving, by the control circuitry 15, a signal indicative of a temperature of an exhaust aftertreatment system (EATS);
S22 determining whether the temperature of the EATS is below a threshold level; and when so:
S23 setting, when starting the internal combustion engine 2, a drive power/speed of the positive displacement machine 9 to a level that forms part of the second operation mode where the pressure ratio (PR) is below 1.

Figures 6, 7:
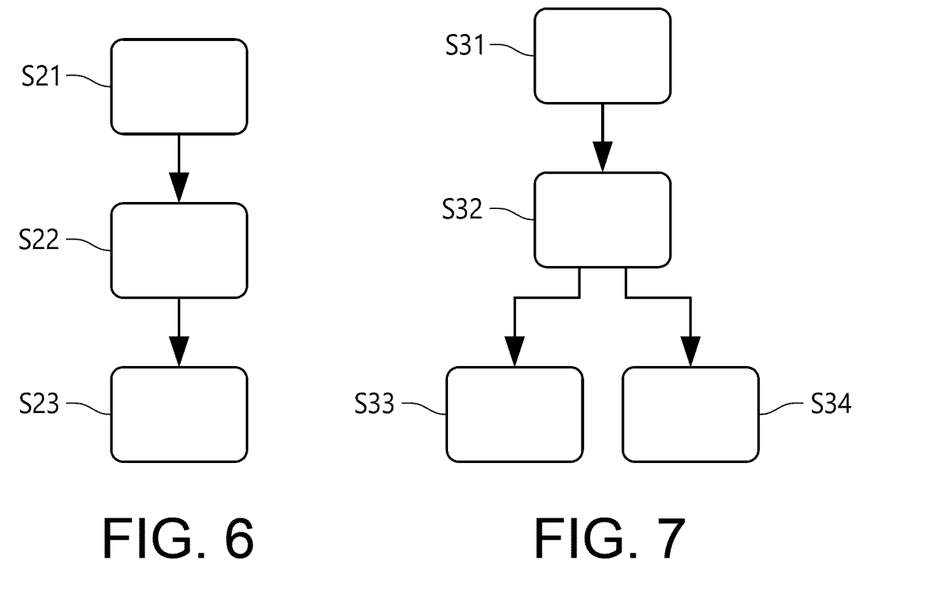

In step S23, similar to step S13, the temperature of the exhaust gas increases so as to heat up the EATS. Step 23 may be followed by a step of verifying that the EATS temperature is sufficiently high and a step of switching engine operation mode to some suitable mode.

A fourth example (FIG. 7) of a method of controlling the internal combustion engine system 1 when operating the positive displacement machine in the second mode comprises the steps of:
S31 driving the positive displacement machine at least partly by means of the exhaust gas flowing through the exhaust gas system,
S32 recovering an energy transferred from the exhaust gas flow to the positive displacement machine while driving the positive displacement machine, and
S33 converting the recovered energy to electric energy and using the electric energy for driving electric equipment or for charging an electric battery; or S34 using the recovered energy for adding driving power to a crankshaft of the engine.

The electric energy generated in step S33 may be used for adding power to the crankshaft via electric equipment, whereas in step S34 the recovered (mechanical) energy can be used for adding driving power to the crankshaft without any intermediate conversion to electric energy.

It is to be understood that the present invention is not limited to the embodiments described above and illustrated in the drawings; rather, the skilled person will recognize that many changes and modifications may be made within the scope of the appended claims.

The invention claimed is:

1. An internal combustion engine system comprising
an internal combustion engine provided with at least one cylinder,
an air intake system arranged to feed air to the at least one cylinder,
an exhaust gas system arranged to feed exhaust gas away from the at least one cylinder,
a turbocharger arrangement comprising a turbocharger turbine operatively connected to a turbocharger compressor,
wherein the air intake system is arranged to feed intake air via the turbocharger compressor and wherein the exhaust gas system is arranged to feed exhaust gas via the turbocharger turbine so as to drive the turbocharger compressor,
wherein the internal combustion engine system further comprises a turbomachine arranged in the exhaust gas system downstream of the turbocharger turbine,
wherein the turbomachine is a positive displacement machine configured to displace gas from an inlet to an outlet thereof by trapping a fixed amount of gas and forcing that trapped amount of gas from the inlet to the outlet,
wherein the internal combustion engine system further comprises a variable drive unit arranged to drive the positive displacement machine, and
wherein the internal combustion engine system is configured to control the drive unit so as to control a flow of exhaust gas through the positive displacement machine,
wherein the internal combustion engine system is configured to control the drive unit so as to operate the positive displacement machine in at least a first mode where a pressure ratio given by a pressure at the outlet of the positive displacement machine divided by a pressure at the inlet of the positive displacement machine is above 1,
wherein the internal combustion engine system is configured to control the drive unit so as to operate the positive displacement machine in at least a second mode where a pressure ratio given by a pressure at the outlet of the positive displacement machine divided by a pressure at the inlet of the positive displacement machine is below 1,
wherein the internal combustion engine system is configured to control the drive unit so as to operate the positive displacement machine in at least a third mode where a pressure ratio given by a pressure at the outlet of the positive displacement machine divided by a pressure at the inlet of the positive displacement machine is substantially equal to 1, and
wherein the internal combustion engine system is configured to operate the positive displacement machine in different modes or drive levels in dependence of an operating mode of the internal combustion engine.

2. The internal combustion engine system according to claim 1, wherein the positive displacement machine comprises at least one rotary member operatively connected to the drive unit, wherein the internal combustion engine system is configured to control a rotation speed of the rotary member.

3. The internal combustion engine system according to claim 1, wherein the internal combustion engine system is configured to be capable of transferring a driving power both from the variable drive unit to the positive displacement machine as well as from the positive displacement machine to the variable drive unit.

4. The internal combustion engine system according to claim 1, wherein the positive displacement machine is a rotary roots type blower having a pair of rotary members provided with meshing lobes.

5. The internal combustion engine system according to claim 1, wherein the drive unit is an electric motor, preferably an electric motor/generator.

6. The internal combustion engine system according to claim 1, wherein a first pressure sensor is arranged in the exhaust gas system upstream the positive displacement machine and downstream the turbocharger turbine.

7. The internal combustion engine system according to claim 1, wherein a second pressure sensor is arranged in the exhaust gas system downstream the positive displacement machine.

8. The internal combustion engine system according to claim 1, wherein the internal combustion engine system is provided with a control system configured to control operation of the internal combustion engine system, wherein the control system comprises a control circuitry configured to receive input signals, make calculations, and send control signals to at least the variable drive unit arranged to drive the positive displacement machine.

9. A vehicle comprising an internal combustion engine system arranged to power propulsion of the vehicle, wherein the internal combustion engine system is arranged according to claim 1.

10. A method of controlling an internal combustion engine system comprising
an internal combustion engine provided with at least one cylinder,
an air intake system arranged to feed air to the at least one cylinder,
an exhaust gas system arranged to feed exhaust gas away from the at least one cylinder,
a turbocharger arrangement comprising a turbocharger turbine operatively connected to a turbocharger compressor,
wherein the air intake system is arranged to feed intake air via the turbocharger compressor and wherein the exhaust gas system is arranged to feed exhaust gas via the turbocharger turbine so as to drive the turbocharger compressor,
wherein the internal combustion engine system further comprises a positive displacement machine arranged in the exhaust gas system downstream of the turbocharger turbine,
wherein the positive displacement machine is configured to displace gas from an inlet to an outlet thereof by trapping a fixed amount of gas and forcing that trapped amount of gas from the inlet to the outlet, and
wherein the internal combustion engine system further comprises a variable drive unit arranged to drive the positive displacement machine, said method comprising:
controlling the drive so as to control a flow of exhaust gas through the positive displacement machine,
wherein the method comprises:
controlling the drive unit so as to operate the positive displacement machine in at least one of a first, a second and a third mode, wherein, in the first mode, a pressure ratio given by a pressure at the outlet of the positive displacement machine divided by a pressure at the inlet of the positive displacement machine is above 1, wherein, in the second mode, the pressure ratio is below 1, and wherein, in the third mode, the pressure ratio is substantially equal to 1, and
wherein the method comprises:
operating the positive displacement machine in different modes or drive levels in dependence of an operating mode of the internal combustion engine.

11. The method according to claim 10, wherein the method comprises:
receiving a signal indicative of a desire for increased engine power;
increasing a drive power/speed of the positive displacement machine to a level that is higher than when receiving the signal indicative of the desire for increased engine power and that forms part of a first operation mode of the positive displacement machine where a pressure ratio given by a pressure at the outlet of the positive displacement machine divided by a pressure at the inlet of the positive displacement machine is above 1.

12. The method according to claim 10, wherein the method comprises:
receiving a signal indicative of a temperature of an exhaust aftertreatment system;
determining whether the temperature of the exhaust aftertreatment system is below a threshold level: and when so:
reducing a drive power/speed of the positive displacement machine to a level that is lower than when receiving the signal indicative of the temperature of the exhaust aftertreatment system;
or, if the internal combustion engine is not in operation when receiving the signal indicative of the temperature of the exhaust aftertreatment system:
setting, when starting the internal combustion engine, a drive power/speed of the positive displacement machine to a level that forms part of a second operation mode of the positive displacement machine where a pressure ratio (PR) given by a pressure at the outlet of the positive displacement machine divided by a pressure at the inlet of the positive displacement machine is below 1.

13. The method according to claim 10, wherein, when operating the positive displacement machine in the second mode, the method comprises the steps of:
driving the positive displacement machine at least partly by means of the exhaust gas flowing through the exhaust gas system, and
recovering an energy transferred from the exhaust gas flow to the positive displacement machine while driving the positive displacement machine.

14. The method according to claim 13, wherein recovering the transferred energy comprises:
converting the recovered energy to electric energy and use the electric energy for driving electric equipment or for charging an electric battery; or
using the recovered energy for adding driving power to a crankshaft of the engine.

15. The method according to claim 10, wherein the positive displacement machine comprises at least one rotary member operatively connected to the drive unit, wherein controlling the drive unit comprises controlling a rotational speed of the rotary member.

16. The method according to claim 10, wherein the positive displacement machine is a rotary roots type blower having a pair of rotary members provided with meshing lobes.

17. A control circuitry for controlling an internal combustion engine system, the control circuitry being configured to perform the method according to claim 10.

* * * * *

UNITED STATES PATENT AND TRADEMARK OFFICE
CERTIFICATE OF CORRECTION

| | | |
|---|---|---|
| PATENT NO. | : 11,846,229 B2 | Page 1 of 1 |
| APPLICATION NO. | : 17/622890 | |
| DATED | : December 19, 2023 | |
| INVENTOR(S) | : Martin Bauer and Fredrik Rahm | |

It is certified that error appears in the above-identified patent and that said Letters Patent is hereby corrected as shown below:

On the Title Page

Item (71), Applicant reads, "Volvo Truck Corporation, Gothenburg (SE)" should read -- Volvo Truck Corporation, Göteborg (SE) --

Item (73), Assignee reads, "Volvo Truck Corporation, Gothenburg (SE)" should read -- Volvo Truck Corporation, Göteborg (SE) --

Signed and Sealed this
Thirtieth Day of January, 2024

Katherine Kelly Vidal
*Director of the United States Patent and Trademark Office*